United States Patent Office 3,499,138
Patented Mar. 3, 1970

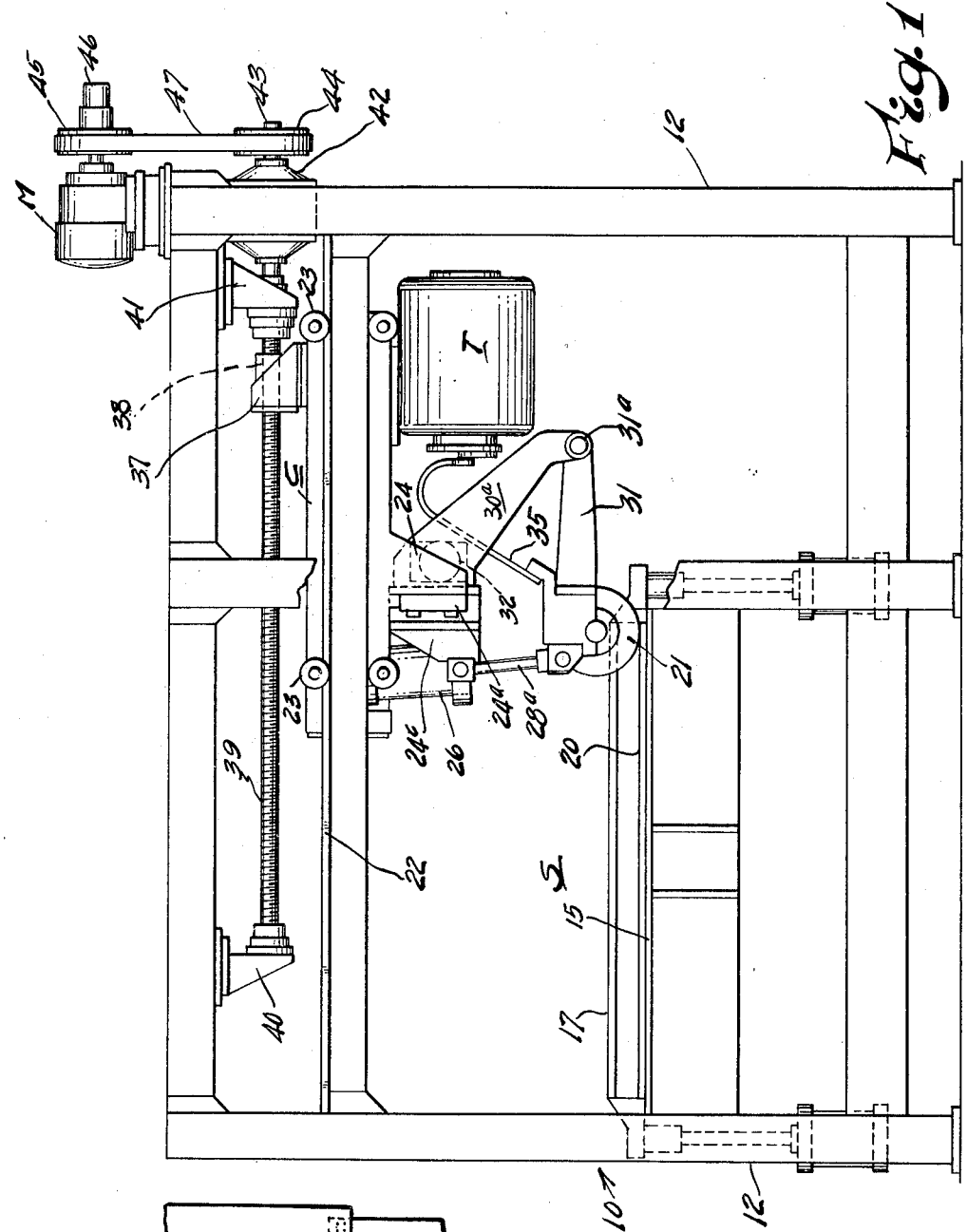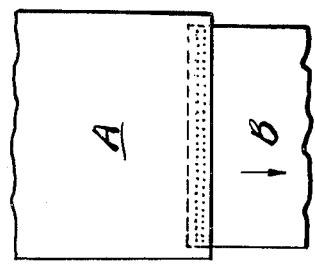

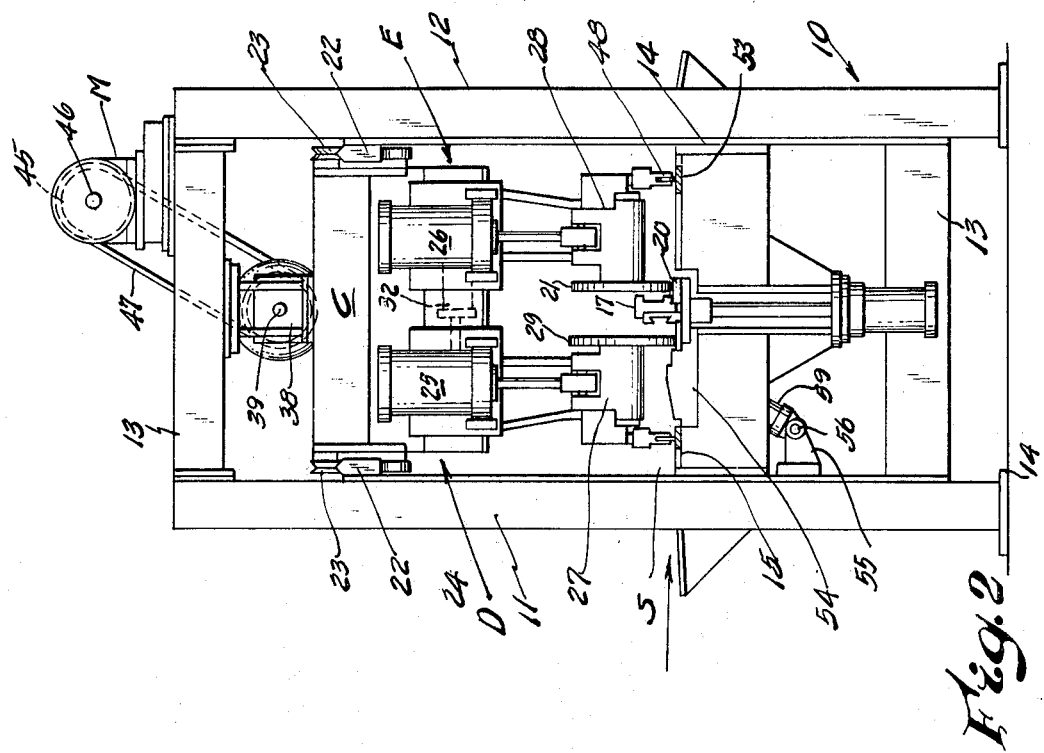

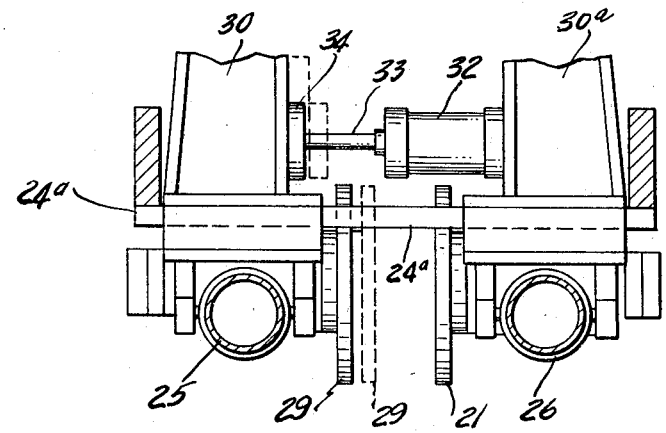
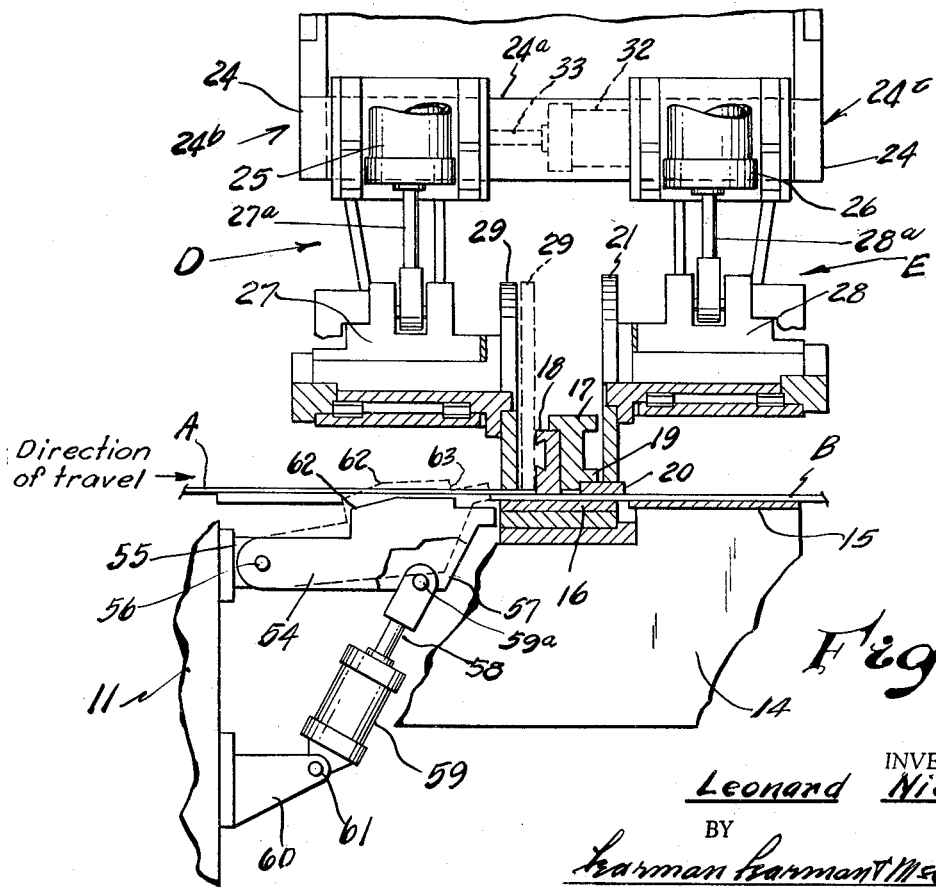

3,499,138
TWO-PASS INDIRECT SEAM WELDER
Leonard Nichols, 1367 Lone Pine Road,
Bloomfield Hills, Mich. 48013
Continuation of application Ser. No. 340,608, Jan. 28, 1964. This application Aug. 24, 1967, Ser. No. 663,179
Int. Cl. B23k 11/06
U.S. Cl. 219—82
3 Claims

ABSTRACT OF THE DISCLOSURE

A two pass welding apparatus for use in joining the leading and trailing ends of metal strips to form a continuous roll.

---

This is a continuation application of application Ser. No. 340,608, filed Jan. 28, 1964, now abandoned.

This invention relates to welding apparatus and more particularly to the type of welding apparatus for use in joining the leading and trailing ends of strip metal sections in end to end relation to form a continuous metal strip.

One of the prime objects of the invention is to design a welding apparatus of the electric resistance type which is operable on overlapped material and designed to produce a seam or narrow lap at high speed, thus providing a considerable saving in time and material, and also providing that the speed of the strip in the line may be maintained at a high overall rate of travel.

Machines of the nature herein described are used in steel mills and similar plants, and are utilized to weld strips together in end to end relation. Ofttimes the ends of the strips to be welded are not uniform, they are sometimes of different widths and thicknesses and require end shearing before being welded together. In the instant process, the ends of the strips are merely placed in overlapping relation, after which these overlapped sections are welded together to provide a continuous strip with welds of excellent quality.

Another object of the invention is to provide a movable weld unit carriage with weld and contact wheels connected therewith, and provide means for transversely spacing one of said wheels with relation to the other.

A further object is to design a welding machine provided with a reciprocating wheeled carriage and provide means for making a weld on the "in" stroke of the carriage, and also a weld on the "out" stroke of said carriage, thus producing more welds with a minimum of equipment in a minimum length of time, with reduced cost and maintenance.

With the above and other objects in view, the present invention consists in the combination and arrangement of parts, hereinafter more fully described, illustrated in the accompanying drawings, and more particularly pointed out in the appended claims; it being understood that changes may be made in the form, size, proportion and minor details of construction, without departing from the spirit, or sacrificing any of the advantages of the invention.

In the drawings:

FIGURE 1 is a side elevational view of a strip welding apparatus constructed in accordance with the teachings of the present invention.

FIGURE 2 is an end elevational view thereof, the arrows indicating the direction of travel of the strip.

FIGURE 3 is an enlarged, fragmentary, part sectional, front elevational view showing the table, welding wheel, etc., the solid lines showing the position of the welding wheel on the "out" stroke, the broken lines showing the position of the welding wheel on the "in" stroke, and the gauge bar in raised position.

FIGURE 4 is a fragmentary, top plan view showing the welding wheel slide mechanism, the broken lines showing the range of travel.

FIGURE 5 is also a fragmentary, front elevational, sectional view showing the welding wheel unit, the sheet contact wheels and insulated table bars, and FIGURE 6 is a side elevational view thereof, the broken lines showing the sheet contact wheel in advanced position for the "in" stroke of the welding unit.

FIGURE 7 is a top plan view showing a welded section of the strips.

Referring now more specifically to the drawings in which I have shown the preferred embodiment of my invention.

The numeral 10 indicates the structural frame of a strip welding machine, said machine comprising spaced apart, fabricated side frames 11 and 12, respectively, connected by transversely disposed cross bars 13 which hold the side frames in spaced apart relation, said frame including a base 14 having a strip passage "S" to accommodate the strips fed to the machine.

A transversely disposed table 15 spans the side frames 11 and 12 and over which the sheet material travels when the machine is in operation, the center section of said table comprising a copper back-up bar 16 extending the length of the table and over which the strip material travels through the machine. A clamp bar 17, substantially T-shaped in cross section, is mounted over the back-up bar 16, and has an insulating member 18 secured to one side thereof which member depends below the lower face of clamp bar 17, said bar having a laterally projecting rib section 19 provided on the opposite side thereof which bears on a center clamp 20, which clamp also forms a path for contact wheel 21 to ride on and conduct current from sheet B to the contact wheel.

In the welding operation, the trailing end of sheet B is placed to overlap the area to be covered by both passes of the weld wheel, and the clamp bar 17 and insulated member 18 is then lowered to clamp sheet B in position, this insulated member also providing a gauge for locating the incoming strip A, the free end of which butts against the insulated member 18 and overlaps the tail end section of strip B to provide an overlapped section of desired width, and this is clamped in position by a second clamp bar (not shown) in the conventional manner.

Carriage tracks 22 are mounted on the side frames 11 and 12, and a weld unit carriage C, provided with track engaging wheels 23, is mounted for travel on said tracks.

Mounting plates 24 depend from the carriage C, and a horizontally disposed member 24a spans said mounting plates with cylinder mounting brackets 24b and 24c provided on said member. Air cylinders 25 and 26, respectively, are rockably mounted in the brackets 24b and 24c, said cylinders being pivotally connected to conventional seam welding bearing heads 27 and 28, respectively, by means of connecting rods 27a and 28a, and the bearing head 27 has a welding wheel 29 journaled thereon as usual.

The bearing head 27 and cylinder 25 with associated parts form a unit D which is connected to the cylinder mounting bracket 24b and is transversely shiftable on the member 24a. An angularly disposed, downwardly extending leg 30 is connected at its upper end to said bracket 24b with the lower end pivotally connected to the free end of arm 31, which forms a part of head 27, by means of pin 31a.

Companion cylinder and bearing 26 and 28 and associated parts form a unit E, they are solid on the companion mounting bracket 24c, and a companion, angularly disposed leg 30a is connected thereto with the end of said leg connected to the arm 31 which forms part of the bearing assembly 28 by means of pin 31a.

For transverse shifting of the cylinder bracket 24b, I provide a slide cylinder 32 which is mounted on the leg 30a, and piston rod 33 is connected to the leg 34 provided in the companion leg 30 in any desired manner so that when the piston is set and air pressure applied, the slide unit D including air cylinder 25, bearing 27, welding wheel and associated parts, will be transversely shifted accordingly.

A transformer T is suspended from the weld carriage C in any satisfactory manner, and conductors 35 conduct the welding current to the bearings and weld wheel to supply the necessary electric current to the welding wheel 29, and the carriage C is also provided with a centrally disposed bracket 37 having a threaded passage 38 therethrough. A horizontally disposed, threaded worm shaft 39 extends through the bracket 37, the ends of said shaft being journaled in bearings 40 and 41, respectively, and the drive end of said worm shaft 39 extends into a gear box 42. A drive shaft 43 projects from said gear box 42 and a sheave 44 is mounted thereon, said sheave being drivingly connected to a sheave 45 mounted on the drive shaft 46 of a motor M by means of a drive belt 47, said motor being mounted on the frame cross bars 13 in any desired manner.

Strip sheet contact wheels 48—48 are mounted on the bearing heads 27 and 28, and provide an indication of the presence or absence of the overlap sheets A and B. Each wheel is mounted on a leg 49 which is pivotally connected to the frame 50 by means of a pin 51, the free ends of said arms engaging a spring actuated piston 52. Insulating bar 53 is provided in the face of the table over which the sheets A and B travel. The sheet contact wheels 48 shift to lead the weld and contact wheels 29 and 21 in either direction of travel. The weld wheel 29 is rendered inoperative by wheels 48 after wheel 29 provides welds at the opposite extreme edges E (FIGURE 6) of the sheet.

The table structure 15 includes an air operated gauge bar 54 which is pivotally connected to a bracket 55 mounted on the side frame 11 by means of a pin 56, said bar being formed with a depending lug 57 which is pivotally connected to the connecting rod 58 of an air cylinder 59 by pin 59a, said cylinder being pivotally connected to bracket 60 by pin 61. The upper face of bar 54 is slightly curved as at 62 so that the strip A readily travels thereover, and the shouldered end 63 of the gauge bar forms a stop against which the strip material B butts when shifted to certain predetermined position, all as clearly shown in FIGURE 3 of the drawings, said rod 58 being actuated to raise the gauge bar a distance sufficient to serve as an end stop for the exit sheet.

In practice, the trailing edge of sheet B is first located to overlap the area covered by both passes of the weld wheel, bringing the end of the sheet against the shouldered end 63 of the gauge bar 62. The next step is to lower the clamp bar 17 onto sheet B which clamps the sheet and provides a path for the contact wheel 21, and the gauge member 18 also provides a gauge for locating the incoming sheet. Incoming sheet A butts against the side of the insulated gauge member 18 and both the contact and the weld wheel cylinders are advanced to extended position, the weld wheel 29 initially contacts the copper back-up bar 16 and contact wheel 21 contacts the center clamp 20.

The weld carriage is next actuated for forward travel, and sheet contact wheels 48—48, which are mounted on the weld and contact wheel assemblies, travel with the carriage and contact both sheets A and B. In practice, a pre-travel time delay is started, said time delay being adjustable to compensate for varying weld carriage speeds. At the end of the time delay, the welding operation begins, the weld pattern being in accordance with the setting of the selector switch (not shown); i.e., continuous, intermittent, etc. The pre-travel time is such that the weld starts at the very edge of the most narrow sheet. The weld wheel 29 travels on sheet A, and the contact wheel 21 travels on center clamp 20, with the weld current flowing in a path as follows:

From the welding transformer T the current flows through conductors 35 and bearing 27 to the weld wheel 29, and from the weld wheel 29 to sheet A, thence through sheet A to sheet B. The current now divides into two paths, the amount in each path being dependent on the relative conductivity of the copper back-up bar 16 and the conductivity of sheet B, the conductivity being a function of both the thickness and the type of material. One path is through sheet B to the center clamp bar 17, and the other path is through the back-up bar 16 and to the center clamp bar 20 through sheet B again, thence from clamp bar 20 to contact wheel 21 and back to the transformer.

During the carriage travel, the sheet contact wheels 48—48 are in continuous contact with the sheets A and B and maintain the weld signal, and when either contact wheel 48 travels off sheet, the carriage is stopped, final weld is completed at edge of sheet, and the weld pressure is then released from the weld wheel 29, and the slide air cylinder 33 is air actuated to shift the weld wheel 29 toward the center clamp bar and into position for the second weld pass. Upon completion of the weld shift, the full weld force is again applied, the welding sequence is initiated, and carriage return travel is started. Upon the carriage return stroke, both sets of sheet contact wheels 48 are advanced by the transfer cylinder 65 to lead the weld wheel 29 in the direction of travel. When the sheet contact wheels 48 travel off the narrowest sheet, the weld initiating circuit is opened, stopping the weld sequence and carriage travel, the last weld being at the edge of the narrow sheet.

In the foregoing description, I have shown and described one embodiment of my invention, but it will be apparent that other adaptations and modifications may be made without departing from the scope of the following claims.

I claim:

1. Apparatus for positioning and welding metal sheets end-to-end in overlapping relation comprising:
   a support means for said sheets;
   means for positioning and clamping the trailing end of one sheet and the leading end of another sheet in overlapping relation;
   a welding carriage mounted on said apparatus;
   welding means including first and second laterally spaced apart wheel means rotatably mounted on said carriage for providing welding current to the sheets;
   means for moving said carriage and said wheel means inwardly and outwardly across said overlapping sheets;
   said first wheel means being movable into welding engagement with said overlapped sheets for completing a single line of weld across the overlap on both the inward and outward travel of said carriage;
   means for sensing the presence or absence of said sheets;
   said welding means being responsive to said sensing means for rendering said welding means inoperative; and
   means for shifting said first wheel means laterally relative to the other of said wheel means for spacing one line of weld from the other as the apparatus is operated.

2. Apparatus as set forth in claim 1 wherein said means for indicating the presence or absence of said sheets includes a pair of contact wheels rotatably mounted on opposite sides of said first and second spaced apart wheels for engaging opposite ones of said sheets, said welding means being rendered inoperative when one of said contact wheels and its respective sheet are disengaged.

3. Apparatus as set forth in claim 2 wherein means for shifting said first wheel means includes means responsive to one of said contact wheels and its respective sheet being disengaged.

References Cited

UNITED STATES PATENTS

| | | | |
|---|---|---|---|
| 1,738,465 | 12/1929 | Wagner et al. | 219—82 |
| 1,172,301 | 2/1916 | Murray et al. | 219—82 |
| 2,802,598 | 8/1957 | Petterson | 200—61.42 |
| 3,079,487 | 2/1963 | Rohr. | |
| 3,090,350 | 5/1963 | Walters | 200—61.42 |

JOSEPH V. TRUHE, Primary Examiner

L. A. ROUSE, Assistant Examiner